United States Patent
Hirn

(10) Patent No.: US 6,836,571 B1
(45) Date of Patent: Dec. 28, 2004

(54) METHOD FOR CONVERTING DIGITAL RASTER DATA OF A FIRST RESOLUTION INTO DIGITAL TARGET DATA OF A SECOND RESOLUTION

(75) Inventor: Andreas Hirn, Pliening (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/555,425

(22) PCT Filed: Nov. 27, 1998

(86) PCT No.: PCT/EP98/07689

§ 371 (c)(1),
(2), (4) Date: May 30, 2000

(87) PCT Pub. No.: WO99/28864

PCT Pub. Date: Jun. 10, 1999

(30) Foreign Application Priority Data

Nov. 28, 1997 (DE) .......................... 197 52 927

(51) Int. Cl.$^7$ .............................. G06K 9/32; G09G 5/00
(52) U.S. Cl. ....................... 382/298; 358/1.2; 345/660
(58) Field of Search .................... 382/254, 264–275, 382/298–300, 162, 262, 263; 345/611, 660, 673, 606, 472; 348/240; 358/1.2, 3.07, 447, 525, 528

(56) References Cited

U.S. PATENT DOCUMENTS

| 4,029,947 A | * | 6/1977 | Evans et al. ................. 345/472 |
| 5,270,836 A | | 12/1993 | Kang |
| 5,394,485 A | | 2/1995 | Lowe et al. |
| 5,440,407 A | * | 8/1995 | Overton ...................... 358/447 |
| 5,646,741 A | | 7/1997 | Horiuchi et al. |
| 5,655,061 A | * | 8/1997 | Tse et al. ...................... 358/1.2 |
| 5,757,982 A | * | 5/1998 | Tepmongkol ............... 382/298 |
| 5,793,379 A | * | 8/1998 | Lapidous .................... 345/606 |
| 5,872,572 A | * | 2/1999 | Rossignac ................... 345/428 |
| 5,982,508 A | * | 11/1999 | Kashihara .................. 358/3.08 |
| 6,002,446 A | * | 12/1999 | Eglit ........................... 348/581 |
| 6,034,786 A | * | 3/2000 | Kwon ......................... 358/1.2 |
| 6,091,859 A | * | 7/2000 | Sonobe et al. .............. 382/298 |

FOREIGN PATENT DOCUMENTS

| DE | 40 27 897 A1 | 3/1991 |
| DE | 42 06 277 A1 | 6/1993 |
| DE | 195 06 792 A1 | 9/1996 |
| DE | 197 13 079 | 3/1997 |
| EP | 0 006 351 | 1/1980 |
| EP | 0 708 415 A2 | 4/1996 |
| EP | 0 506 379 B1 | 5/1997 |
| WO | WO 96/16380 | 5/1996 |

OTHER PUBLICATIONS

A. Iwainsky et al., LEXIKON Der Computergrafik und Bildverarbeitung.
IBM Technical Disclosure Bulletin, "Fast Scaling Method to Reduce Binary Images by Specific Factors", pp. 357–359.

* cited by examiner

Primary Examiner—Kanjibhai Patel
(74) Attorney, Agent, or Firm—Schiff Hardin LLP

(57) ABSTRACT

The invention relates to a method for converting digital source raster data of a first resolution into digital target raster data of a second resolution. The data is scaled and smoothed in an individual pixel by pixel manner, whereby the raster source data is smoothed. A combined scaling-smoothing rule can be formed from a plurality of scaling rules or smoothing rules.

22 Claims, 10 Drawing Sheets

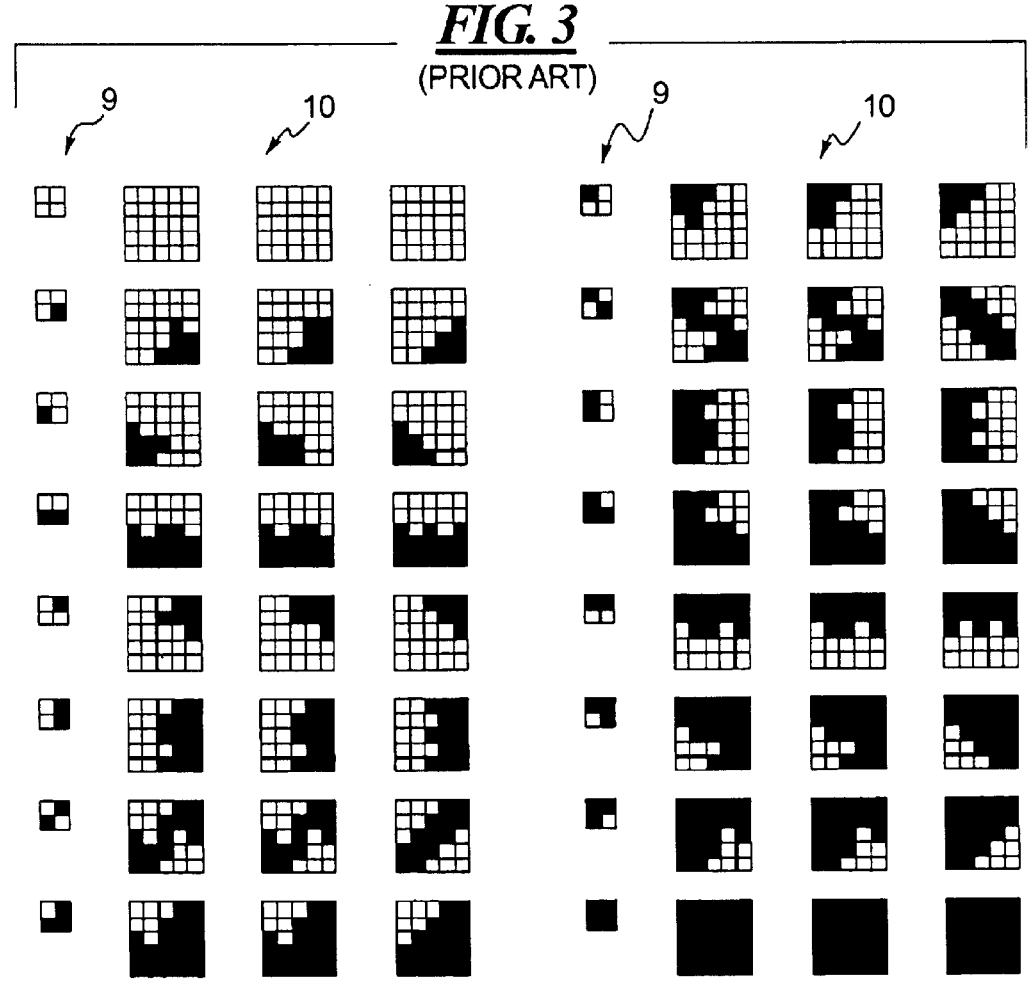

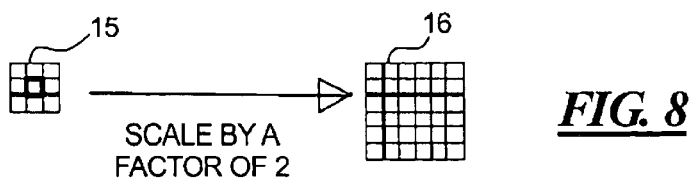
FIG. 8
FIG. 9a FIG. 9c FIG. 9e
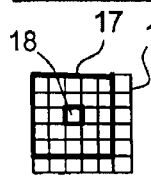 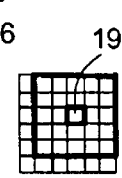 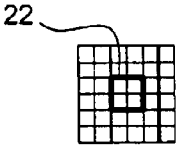
FIG. 9b FIG. 9d
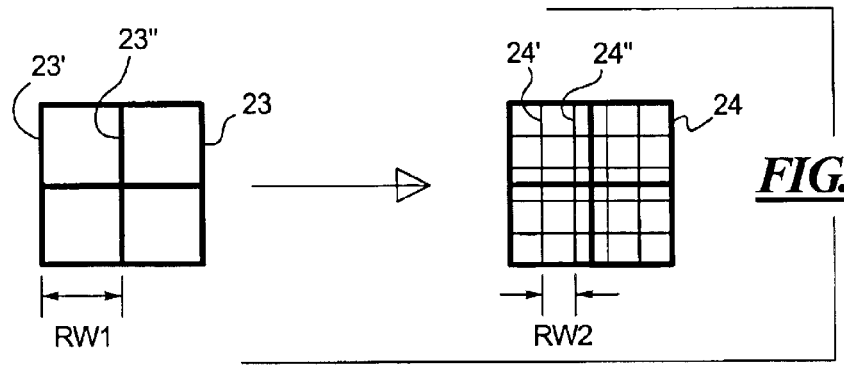
FIG. 10
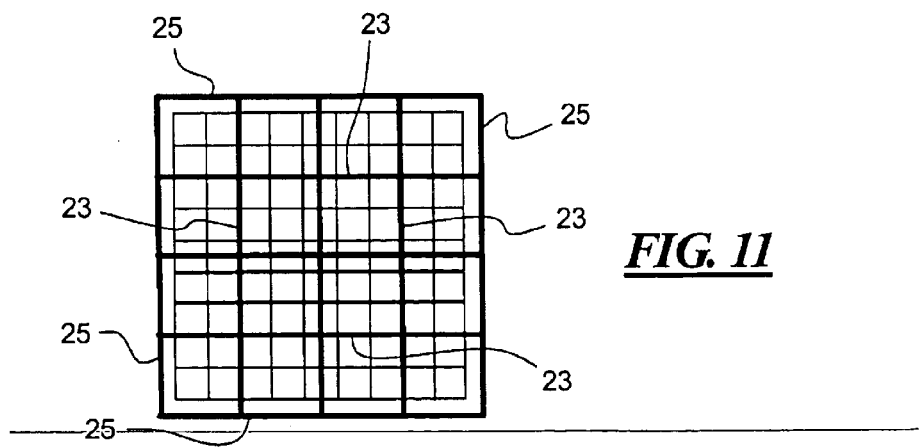
FIG. 11

METHOD FOR CONVERTING DIGITAL RASTER DATA OF A FIRST RESOLUTION INTO DIGITAL TARGET DATA OF A SECOND RESOLUTION

BACKGROUND OF THE INVENTION

1. Field of the Invention

The invention is directed to a method for converting digital source data in the raster of a first resolution into digital target data having a second resolution according to the preamble of patent claim 1.

2. Description of the Related Art

In digital data processing, it is often necessary to convert digital image data that are present in the raster of a first resolution into target data having a second resolution. Each picture element, i.e. a point in the raster allocated to the digital value, is thereby referred to as pixel. Without gray levels, thus, a pixel corresponds to one bit. The topical resolution is thereby indicated in picture elements per inch (dots per inch, dpi). As known, one inch corresponds to 25.4 mm. The second resolution (target resolution) is usually higher than the first (source resolution). The target image in the second resolution can also contain more gray scale values per pixel than the source image instead of or in addition to the higher topical resolution.

For example, it often occurs in digital printing technology that image data are supplied by a computer in a first raster, for example in a 240 dpi raster, but are to be reproduced by a printer in a different raster, for example in a 600 dpi raster. Particularly when expanding an existing EDP system by a modern printer, it occurs that print jobs that were produced earlier comprise, for example, only masters in 240 dpi resolution. When the user wishes to use a new printer with, for example, a resolution of 600 dpi, then the print data must be correspondingly converted. The conversion should thereby ensue automatically without requiring inputs by the user.

Since half the pixels cannot be represented in playback units having discrete presentation levels such as LCD picture screens or digital printers, specific rules must be erected for conversions by factors of the resolution that are not whole-numbered.

The conversion can then ensue such that each value of the first raster is multiplied by a scaling factor SF that is prescribed by the ratio of the two resolution values of the rasters, that, thus, for example, the SF-fold set of identical values in the second raster is generated from a value in the first raster, whereby the following applies:

$$SF_i = \frac{\text{resolution of the second raster in direction } i}{\text{resolution of the first raster in direction } i} \qquad \text{(Equation 1)}$$

Although the data are transformed into the target raster with such a scaling procedure, the playback quality is thereby not improved.

On the other hand, the conversion of data into a raster having higher resolution in fact enables the improvement of the playback quality in that, for example, contours are more finely drawn. It is usually necessary to smooth the data for such a conversion. In known smoothing methods, smoothing parameters usually enter into the smoothing process in the form of a matrix or, respectively, of a window, whereby the weighting of neighboring picture elements of a point to be smoothed is prescribed by the values of the matrix. Given $SF_x=SF_y$, such windows are 3×3 windows or 5×5 windows.

A method for scaling and smoothing image data is disclosed by German Patent Document DE 195 06 792 A1. In this method, a plurality of sets of pixel patterns or, respectively, Boolean calculating operations allocated to them are provided, with reference whereto the conversion ensues. For conversion, a matrix of source image data having, for example, 7×7 picture elements is subjected to the basic calculating operations and the target image data are acquired therefrom. When scaling the image data "up" (SF>1), a respective group of target pixels is allocated to a group of source pixels. The calculating operations are configured such that the same number of high-resolution pixels are removed as added on average in the conversion. What is thereby achieved is that the degree of blackening of an overall image is essentially preserved.

What is disadvantageous about this method is that the conversion ensues only in groups with respect to the source pixels. Given, in particular, a scaling factor that is not whole-numbered (a broken scaling factor), one of the target pixels ($\Phi$) can then only be optionally allocated to a cluster of neighboring target pixels, i.e. relatively unmotivated, and cannot be unambiguously allocated to a source pixel. In addition, the allocation must be defined in advance in corresponding method rules.

A method for converting digital image data from a first raster into a second raster that is suitable for non-whole-numbered scaling factors is also disclosed by German Patent Application 197 13 079.8. This method likewise works region-oriented. A target region is thereby allocated to each source region, whereby the two regions having the same position in the overall image. Boolean calculating rules are prescribed within the target region, the conversion ensuing in conformity with these rules.

Another procedure for scaling and smoothing image data is disclosed by European Patent Document EP 506 379 B1 as well as by U.S. Pat. No. 5,270,836. Two steps for scaling and smoothing are provided in this procedure. As schematically shown in FIG. 1, a source image 1 that is present in a source raster is scaled in a first step 2 given this procedure, as a result whereof an intermediate image 3 arises in the target raster. The smoothing in the target raster is implemented on the basis of this intermediate image in the second step 4, as a result whereof the target 5 arises.

What is disadvantageous about the above-described procedure is that a plurality of data in the target raster must be respectively taken into consideration for the smoothing. Due to the relatively great number of memory accesses and calculating operations that are thereby required, the outlay connected therewith is relatively high and is therefore hardly suited for applications such as high-performance printing systems wherein the speed of the conversion is crucial. A realization of the method on the basis of software thus likewise seems hardly possible.

A scaling and smoothing of transmission data can also be necessary in the field of telefax transmission when the data, for example, are received in a first resolution but are stored, forwarded or are to be printed out in a different resolution. A corresponding method for this application is disclosed, for example, by U.S. Pat. No. 5,394,485 A.

Another method for converting image data is disclosed by German Patent Document DE 42 06 277 A1. Only a raster conversion but no smoothing of the image data ensues given this method. European Patent Document EP 708 415 A2 likewise discloses a method for converting image data that, however, is only suitable for whole-numbered scaling factors. European Patent Document EP 0 006 351 A1 discloses an image processing system that works with look-up tables. U.S. Pat. No. 5,657,430 A discloses a method for converting vector fonts onto gray scale bit maps.

U.S. Pat. No. 5,646,741 discloses a method and an apparatus wherein image signals are scaled and smoothed. A check according to predetermined criteria is thereby carried out in the source region to see whether a smoothing should be implemented and the source image signals potentially smoothed. The smoothed image signals are smoothed thereafter.

PCT Published International Application WO-A-96/16380 discloses a system and a method for the interpolation of image signals. A rule is thereby respectively selected from a plurality of interpolation rules. The source image signals are then processed in a plurality of successive steps. In a first step, the image signals are interpolated line-by-line on the basis of a selected, line-related rule. In a second step, the image signals are then interpolated column-by-column on the basis of a second, column-related rule. Finally, the line image signals and the column image signals are compiled in pages by a formatting unit.

SUMMARY OF THE INVENTION

An object of the method is to provide a method for converting digital image data from a first raster into a second raster that leads to a high processing speed and that implements both a scaling as well as a smoothing of the image data.

This object is achieved by the invention of a method for converting digital source data referring to source pixels in the raster of a first resolution into digital target data in the raster of a second resolution, including the data are scaled by at least one scaling factor, each source datum having a target image matrix allocated to it on the basis of a surround window surrounding the source pixel and the target data being determined from neighboring target image matrices such that each target pixel is directly formed from a source pixel taking the surroundings thereof into consideration, each source datum being employed for smoothing the target data to be determined from all neighboring source data, and the scaling and the smoothing being implemented in a common processing step such that the target data are smoothed in the raster of the source data. In a further embodiment, the method for converting digital source data in the raster of a first resolution into digital target data in the raster of a second resolution, includes the data being scaled by a scaling factor and being smoothed, a scaling rule being prescribed from a plurality of selectable scaling rules, a smoothing rule being prescribed from a plurality of smoothing rule, a single scaling and smoothing rule being formed from the selected scaling rule and the selected smoothing rule, both a smoothing of the target data in the raster of the source data as well as a scaling ensuing in respectively one processing step with said single scaling and smoothing rule during the formation of the target data, each source datum having a target image matrix allocated to it on the basis of a surround window surrounding the source pixel and the target data being determined from neighboring target image matrices such that each target pixel is directly formed from a source pixel taking the surroundings thereof into consideration, each source datum being employed for smoothing the target data to be determined from all neighboring source data.

According to a first aspect of the invention, the data are scaled by at least one scaling factor and a target image matrix is allocated to each source datum by individual pixels, i.e.—pixel-individually with respect to the source pixels, on the basis of a surround window surrounding the source pixel. The target data are determined from neighboring target image matrices, whereby the data are smoothed in the raster of the source data. Each source datum is thus employed for smoothing all neighboring source data.

According to the first aspect of the invention, the smoothing of the data is implemented in the raster of the source data and not in the target raster. A significantly faster data processing given two-dimensional image data is thus possible than given comparable methods that implement the smoothing in the target raster because the data set onto which the smoothing function is applied is significantly smaller. This processing speed is approximately lower by the square of the scaling factor SF for the case of identical scaling factors in x-direction and in y-direction ($SF=SF_x=SF_y$). The first aspect of the invention is particularly suitable for the conversion of image data given a non-whole-numbered broken) scaling factor. Due to the processing based on individual pixels, the advantage over previously known methods is achieved that the processing of the data given broken scaling factor can ensue nearly analogous to the processing given whole-numbered scaling factor. The first aspect of the invention is based on the perception that the same result can be achieved with a smoothing in the source raster as with a smoothing that is applied to a significantly greater plurality of data in the target raster because the structures to be smoothed are already to be defined from the source image. The scaling of an image by a factor greater than one in fact increases the plurality of pixels to be smoothed; the informational content of the bit map on which the image is based, however, remains unmodified. Tests have shown that a smoothing with rules that erected in the target raster does not yield different results than when corresponding rules for smoothing are already erected on the basis of the data in the source raster.

It is also perceived that the time required for the smoothing—in a first approximation (i.e., without taking the image edges into consideration)—is directly proportional to the size of the image, and the processing of the data in the source raster can therefore ensue faster than the processing of the data in the target raster.

Proceeding from the known prior art, in particular, it was perceived that a general smoothing method in the target region is based on the existence of all pixel combinations. Since, however, the pixels were highly scaled, there are only a limited plurality of variation possibilities. The informational content of the pixels is not increased by scaling-up. The time required for processing the data can be reduced by the square of the scaling factor as a result of the inventive smoothing of the image data in the source raster compared to methods that smooth in the target raster.

A smoothing with the data of the source image as basis also enables a smaller size of the recognition matrix. Given a scaling factor of 2, a recognition matrix of 3×3 in the source region, for example, achieves the same quality as a 5×5 recognition matrix that is applied in the target region. The result thereof is that only 3×3=9 pixels need be taken into consideration for the recognition in the source region instead of 5×5=25 pixels in the target region. The processing speed of the invention method given direct logical evaluation (in hardware or software) is thus increased in two respects: first, fewer data are to be interpreted in the source raster than in the target raster; second, the size of the smoothing window can be reduced in the source raster. The processing speed is then higher by a factor of up to $25/9\times SF_x \times SF_y$ than in conventional methods. The logical outlay, for example for gate functions, is reduced by this factor. A table having 512 entries is needed for a 3×3 matrix given a realization with look-up tables, which are often utilized in software solutions for performance-enhancement because the bit-by-bit logical interpretation is thereby eliminated and the result is directly obtained from the table. In contrast, this table must have a size of 33554432 entries (32 MB) given a 5×5 matrix. A table of this size is no longer acceptable in practice.

The invention also enables both the function of the smoothing as well as that of the scaling to be implemented in a single step, in that the overall method is implemented in the raster of the source data. The method can thereby be implemented independently of the size of the respective scaling factor. The scaling factor can be both whole-numbered as well as fractional.

In a second aspect of the invention, digital source data in the raster of a first resolution are scaled by a scaling factor and smoothed into digital target data in the raster of a second resolution. A scaling rule is thereby prescribed and a specific smoothing rule is prescribed from a plurality of smoothing rules. The two prescribed rules are then merged such to form a combined scaling and smoothing rule that the smoothing ensues in the raster of the source data, whereby each source datum is employed for smoothing a plurality of neighboring source data. The scaling factor is, in particular, not a whole number and can be presented by a fraction of whole numbers.

A high degree of flexibility in the processing of image data is achieved by the second aspect of the invention. Particularly given a conversion of the method with a software program, a plurality of smoothing and/or scaling methods can thereby be freely combined with one another, and one can react very flexibly to the greatest variety of print data and printer resolutions when printing images. Individual (job-specific) scaling and/or smoothing rules can thereby already be prescribed or selected either in the print job or in the printer device, for example by an operator.

In a third aspect of the invention, it is not only binary data (black-and-white) that are processed; rather, grayscale values or color values covering a plurality of bits or bytes are processed per picture element. It is thereby possible, on the one hand, to implement a "grayscale conversion" wherein the raster refers to gray scales and, thus, a conversion from a first grayscale raster into a second grayscale raster is undertaken per picture element, for example 4 bit grayscale values corresponding to 16 gray scales onto 6-bit grayscale values corresponding to 64 gray scales are scaled up. A grayscale smoothing can thereby also ensue in that more finely graduated grayscale transitions are generated between the picture elements in the target space. On the other hand, it is thereby also possible to convert the picture elements in the location space (i.e., in the dots per inch raster) affected with grayscale values into a finer location space raster upon retention of the grayscale resolution. Analogous to these gray scale conversion versions, color scale conversions, for example a scaling-up from a 32 color bit raster into a more highly resolved 48 color bit raster, can also ensue. A color smoothing analogous to the grayscale smoothing can also be implemented as a result thereof.

The scalings and smoothings in the location space, in the grayscale space and in the color space can thereby be arbitrarily combined with one another.

In a fourth aspect of the invention, the processing of the data ensues byte-oriented. A binary information can thereby respectively be allocated to a plurality of picture elements and the data can be processed parallel. However, gray scales and/or color values can also be allocated to the picture elements (pixels), these in turn comprising a plurality of bits or bytes per pixel. A byte-by-byte processing has a positive effect on the processing speed because digital electronic components, particularly in the field of information processing, likewise internally process the data byte-by-byte and because this byte format is a generally standard memory format.

With every processing clock, the data are thereby shifted in a register by a specific plurality of positions dependent on the height of the smoothing window; after storing a corresponding plurality of bytes (for example, 3 bytes for a processing of 3 lines with 8 pixels each on which a 3×3 smoothing window should respectively act), neighboring data represent an index. This index can be directly employed for addressing a corresponding smoothing matrix (for example, 3×3), whereby the addressing acts either as input signal of a hardware circuit or acts directly on a look-up table within a computer software. The two-dimensional objective of processing image data is thereby converted into a one-dimensional task.

In a preferred exemplary embodiment, a shift register having respectively n bytes per line is filled per processing clock according to the following rules:

$R_O$ through $R_{(A-1)}$ remain unaffected (Rule 1) and $R_{(i+A)}=q(i/Q_y, Q_y-1-(i\%Q_y))$ or $R_{(i+A)}=q(i/Q_y, i\%Q_y)$ (Rule 2), whereby the following apply:

$R_i$: value of the $i^{th}$ register pixel;

$Q_x$: window width in x-direction $Q_y$: window width in y-direction $q(k,l)$: value of the source pixel with the position (k,l)

/: integer division

%: modulo division and $A=W\times(Qy\times(Qx-1))$. The shift register thereby has a width $B=Qy\times W\times((8n/W)-1+Qx)$, whereby 8n/W is whole-numbered, with W: value of a pixel, i.e. bits per pixel (binary, grayscale value, color value)

B: width of the shift register in bits for W=1(binary data), $B=Qy\times(8n-1+Qx)$ is obtained.

It has been shown that the inventive method—particularly given a realization in the form of a software program on a computer—runs significantly faster than comparable methods that first implement a scaling, deposit the result in an intermediate memory and only then implement the smoothing at the intermediately stored data, i.e. in the target raster. What is advantageous given a conversion with software is that the switching can ensue highly suited to need within a print job —when a conversion is required, this ensues with the corresponding modules of the conversion program. When no conversion is required, then the data are forwarded without having been processed by the conversion program. The flexibility can thus be enhanced to such an extent that different resolutions can even be processed within one document to be printed out, i.e. within one page. Whereas, for example, text having a resolution of 300 dpi has a good effect, it is usually expedient to select a resolution of 600 dpi or higher in the reproduction of images.

In the smoothing, it can be necessary to distinguish between image information and text information and to respectively undertake different or, respectively, no smoothing, for example in order to avoid Moiré effects. When the invention is applied in a software, then the advantage can be achieved that no outlay is required for distinguishing between texts and images within a print job. This information is often already contained in the print job in the form of different object identifiers and can be employed for setting the smoothing rules.

The scaling and smoothing can ensue in a common step with a look-up table that contains data for both procedures. The source data are thereby preferably directly employed for addressing the look-up table.

BRIEF DESCRIPTION OF THE DRAWINGS

Further advantages and effects of the invention become clear on the basis of the following description that is supplemented by Figures.

Shown are:

FIG. 3 various combination possibilities in an image data conversion of 2×2 source pixels;

FIG. 8 a scaling procedure by a scaling factor of 2;

FIG. 9 a smoothing procedure with a 5×5 matrix;

FIG. 10 a scaling by the factor 2.5;

FIG. 11 a sketch underlying a smoothing procedure;

DETAILED DESCRIPTION OF THE INVENTION

Figure 1:
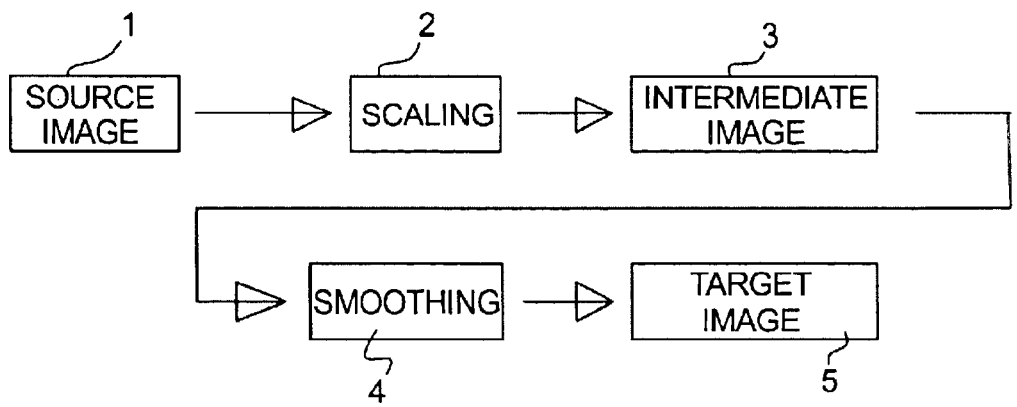
FIG. 1 a procedure of the prior art.
Figure 2A:
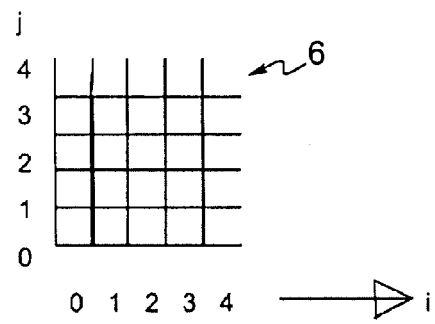
FIG. 2 a mathematical model on which the invention is based.

A fundamental investigation and a mathematical modeling of the scaling ensue first with reference to FIG. 2. The observations about the scaling are based on the discrete i-j coordinate system 6 shown in FIG. 2a, whereby i references the pixel index in x-direction and j references the pixel index in y-direction.

Figure 2B:
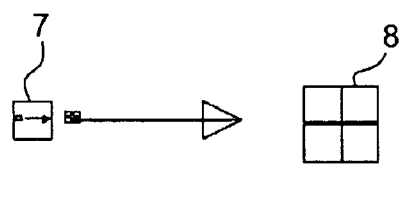
Figure 2C:
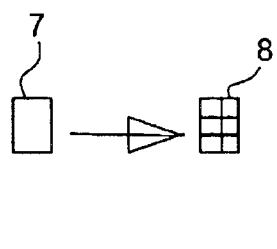

By way of example, FIG. 2b shows a scaling by a scaling factor 2 as occurs given a conversion from a 300 dpi source raster onto a 600 dpi target raster. Each source pixel 7 is thereby two-dimensionally treated, i.e. doubled in each of the directions x and y. The raster spacings are twice as great in the source raster as in the target raster. One pixel 7 in the source region becomes four pixels in the target region. As shown in FIG. 2c, the scaling factor can also be different in the x-and y-directions, for example have the value 2 in x-direction and the value 3 in y-direction.

Non-Whole-Numbered Scaling Factor

When a scaling factor that is not a whole number is to form the basis, for example the scaling factor 2.5 corresponding to a conversion from a 240 dpi source raster onto a 600 dpi target raster, then one proceeds analogous to whole-numbered scaling factors. This procedure is schematically shown in FIG. 2d. Theoretically, 2.5×2.5 pixels 8 in the target region derive from one pixel 7 in the source region.

Since the half pixels can not be digitally presented, a group of pixels is initially considered as starting basis for the scaling procedure, whereby a solution for the following task must be found:

"What is sought is the smallest whole number of source pixels for each coordinate direction that leads to a whole number of target pixels in the same direction in the scaling."

For a conversion of 240 dpi onto 600 dpi, this condition is met, for example, with two source pixels and 5 target pixels. When one proceeds on the basis of a 2×2 pixel square in the source region, then one obtains a 5×5 pixel square in the target region given the scaling factor 2.5.

There are 16 combinations that must be imaged onto the target region derive from the 2×2 pixels in the source region. These 16 combinations of possible source squares 9 in the source region are shown in FIG. 9, whereby black pixels stand for the binary information "1". Respectively three possible target squares 10 in the 5×5 target matrix onto which these source data can be imaged are indicated to the right adjacent to each of the 2×2 pixel squares of the source data.

An example for a conversion having a scaling factor that is not a whole number is indicated below (FIGS. 10 through 13).

Mathematical Model for the Scaling Method

Given scaling factors that are whole numbers, one proceeds according to the following equation in a first scaling method:

$$sc_{(i,j)} = q_{\left(\frac{i}{sx}, \frac{j}{sy}\right)}, \qquad \text{(Equation 2)}$$

with:

$sc_{(i,j)}$ value of the target pixel (0 or 1) to be calculated
i,j coordinates in the target raster
$q_{(a,b)}$ value of the corresponding source pixel
sx scaling factor in x-direction
sy scaling factor in y-direction A source pixel is imaged onto a rectangle having sx*sy target pixels, i.e. a plurality of target pixels are derived from one source pixel.

Figure 4:
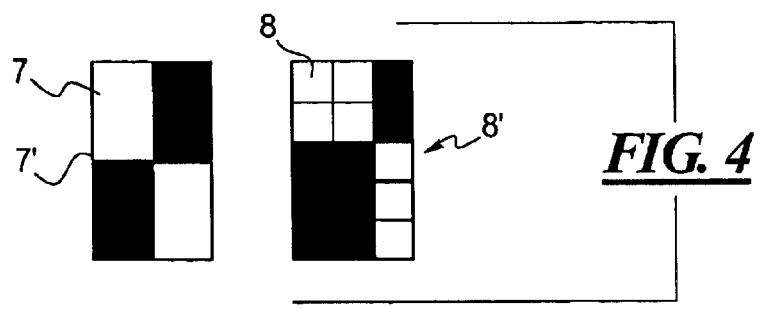
FIG. 4 an example of an image data conversion.

The target pixels contain the same value (9/1 given binary data, gray scales or, respectively, color value given non-binary data) as the source pixel. Given scaling factors that are not a whole number, the scaling factors enter into Equation 2 as a fraction:

$$sc_{(i,j)} = q_{\left(i*\frac{sx_N}{sx_Z}, j*\frac{sy_N}{sy_Z}\right)} \quad \text{(Equation 3)}$$

with:
$sx_N$ denominator of the scaling factor in x-direction
$sx_Z$ numerator of the scaling factor in x-direction
$sy_N$ denominator of the scaling factor in x-direction
$sy_Z$ numerator of the scaling factor in y-direction FIG. 4 shows a corresponding example with sx=1.5=3/2 and sy=2.5=5/2, whereby four source pixels 7 are converted into 15 target pixels 8.

Scaling with scaling factors that are not whole numbers according to Equation 3 yields asymmetrical results. As in the case of whole-numbered scaling factors, each target pixel is derived from one source pixel. The plurality of target pixels that are derived from a specific source pixel, however, is thereby dependent on the location of the target pixel and is not always the same; an asymmetry therefore arises.

Figure 5:
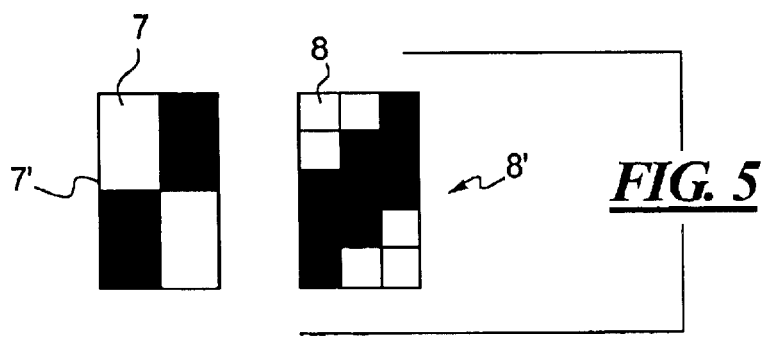
FIG. 5 a further example of an image data conversion.

An improvement compared to the first scaling method is obtained when a rectangle of $sx_N * sy_N$ source pixels are combined to a block 7' that can be represented in the target region without sub-pixels. Such rectangles are scaled block-by-block into corresponding target blocks 8' with $sx_Z \times sy_Z$, in that each target pixel is derived from the source pixels from the source block via a logical equation. Each target pixel can then be dependent on a plurality or, respectively, on from one through all source pixels. The conversion described for FIG. 4 could then look the way it is shown in FIG. 5.

The following logical equations are thereby applied:

sc(0,0)=sc(0,1)=q(0,0)
sc(0,3)=sc(0,4)=q(0,1)
Ssc(2,0)=sc(2,1)=q(1,0)
sc(2,3)=sc(2,4)=q(1,1)
sc(1,0)=q(0,0) && !q(1,1)||(q(0,1) && !q(1,0))
sc(1,4)=(q(1,0) && !q(0,1)||(q(1,1) && !q(0,0))
sc(0,2)=q(9,0)||q)0,1)
sc(2,2)=q(1,0)||q(1,1)
sc(1,1)=(q(0,0) && q(1,0))||(q(0,0) && !q(1,1))||(q(1,0) && q(0,1))
sc(1,3)=(q(0,1) && q(1,1))||(q(0,1) && q(1,0))||(q(1,1) && q(0,0))
sc(1,2)=(q(0,0) && q(1,1))||(q(1,0) && q(0,1))

One equation exists for each target pixel; there are sxZ & syZ equations per block that contain dependencies of sxN*syN source pixels. In the general form, this then looks as follows:

$$sc_{(i,j)} = fscal(i\%sxZ, j\%syZ)\left( q_{\left(i*\frac{sx_N}{sx_Z}(i\%SX_N)+0, j*\frac{sx_N}{sx_Z}(j\%SY_N)+0\right)}, \cdots \right.$$

$$q_{\left(i*\frac{sx_N}{sx_Z}(i\%SX_N)+(SX_N-1), j*\frac{sy_N}{sy_Z}(j\%SY_N)+0\right)}, \cdots$$

$$q_{\left(i*\frac{sx_N}{sx_Z}(i\%SX_N)+0, j*\frac{sy_N}{sy_Z}(j\%SY_N)+(SY_N-1)\right)}, \cdots ,$$

$$\left. q_{\left(i*\frac{sx_N}{sx_Z}(i\%SX_N)+(SX_N-1), j*\frac{sy_N}{sy_Z}(j\%SY_N)+(SY_N-1)\right)} \right)$$

(Equation 4), whereby the following is again valid:
−:= integer division
%:= modulo division Equation 4 describes a general scaling method which covers the two above-described scaling methods.

There are ($sx_Z * sy_Z$) logical equations with respectively up to ($sx_N * sy_N$) dependencies. It can occur at the top and right-hand edges that the source blocks are not completely occupied with source pixels; the width and height of the source image is arbitrary and is not necessarily a multiple of the source blocks. Elements that do not exist must be assumed to have not been set, usually white (0).

Mathematical Modeling of the Edge Smoothing in the Target Raster

In an edge smoothing, each pixel is observed in its environment. To that end, a quadratic smoothing window (smoothing matrix) with an uneven pixel edge length is shifted over all pixels to be smooth. Dependent on the environment and its own pixel value (the recognized structure in the smoothing window), a decision is made as to whether the pixel should be black or white given binary data; the resulting value is determined given grayscale values or color values. Only pixel values are usually shifted in sum over all pixels; the sum of the pixels that are set or, respectively, not set with the digital values "0" or, respectively, "1" or, respectively, the average grayscale value or color value remains nearly the same.

According to the method disclosed by DE 195 06 792 A1, the smoothing ensues by attaching and removing pixels; the structures to be recognized and to be corrected are also referred to as rules. The size of the environment to be considered (size of the smoothing window, of the smoothing matrix) is dependent on the prescription as to which structures are to be recognized and smoothed.

The environment of a pixel is described below in the form of an order of the neighbors to be considered. Neighbors of the first order are the direct neighbors, i.e. all pixels that share at least one corner with the pixel to be investigated. Overall, this yields the investigated pixel and eight neighbors. Neighbors of the second order are all pixels that share at least one corner with the neighbors of the first order, etc.

In tabular form, this yields the following situation:

TABLE 1

| Structure to be recognized | Order | Size of the Smoothing Window | Pixels to be Considered |
|---|---|---|---|
| 45° lines (1—1) | 1 | 3 × 3 | 9 |
| (1–2)/(2–1) – lines | 2 | 5 × 5 | 25 |
| (1–3)/(3–1) – lines | 3 | 7 × 7 | 49 |
| (1–4)/(4–1) – lines | 4 | 9 × 9 | 81 |

What one then obtains for a smoothing with a 5×5 recognition matrix is $$sm_{(i,j)} = fsmooth(p_{(i-2,j-2)}, p_{(i-1,j-2)}, p_{(i,j-2)}, \quad \text{(Equation 5)}$$

$$p_{(i+1,j-2)}, p_{(i+2,j-2)}, p_{(i-2,j-1)}, p_{(i-1,j-1)},$$

$$p_{(i,j-1)}, p_{(i+1,j-1)}, p_{(i+2,j-1)}, p_{(i-2,j)},$$

$$p_{(i-1,j)}, p_{(i,j)}, p_{(i+1,j)}, p_{(i+2,j)}, p_{(i-2,j+1)},$$

$$p_{(i-1,j+1)}, p_{(i,j+1)}, p_{(i+1,j+1)}, p_{(i+2,j+1)},$$

$$p_{(i-2,j+2)}, p_{(i-1,j+2)}, p_{(i,j+2)}, p_{(i+1,j+2)},$$

$$p_{(i+2,j+2)}$$

The general equation for the smoothing in the target raster reads:

$$sm_{(i,j)} = fsmooth\left(p_{\left(i-\frac{G}{2}, j-\frac{G}{2}\right)}, \cdots , \right.$$

-continued $$p_{(i+\frac{G}{2},j-\frac{G}{2})}, \ldots, p_{(i,j)}, p_{(i-\frac{G}{2},j+\frac{G}{2})}, \ldots, p_{(i+\frac{G}{2},j+\frac{G}{2})}$$

(Equation 6) whereby the following applies:
sm(i,j) value of the pixel to be investigated after the smoothing
P value of a pixel from the smoothing window
G size of the smoothing window
fsmooth logical equation with G×G dependencies that describes the smoothing, and
− integer division.

The above-described smoothing procedure is illustrated below on the basis of the example with binary data shown in FIG. 6. A 45° line is thereby smoothed.

First, the presence of a structure to be smoothed must be investigated. To that end, a recognition matrix of 3×3 (or 5×5, 7×7, . . . ) Pixels is shifted across the image. When a structure to be smooth is recognized, then the value of the pixel in the center of this matrix is defined for the target region. When, by contrast, no structure to be smooth is present, then the pixel value remains unmodified. The conditions for the existence of a structure to be smoothed are referred to as rules.

Figure 6A:
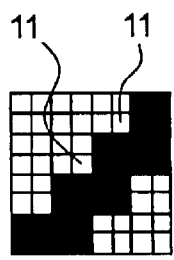
FIG. 6 various presentations of a slanting line in an image raster.
Figure 6B:
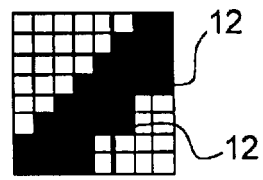
Figure 6C:
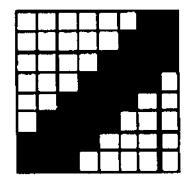

One first proceeds in line direction from left to right within the image illustrated in FIG. 6a. White corner pixels 11 (empty corners at white-to-black transitions) are thereby set to "black" at the structures recognized by the rules, as a result whereof the image shown in FIG. 6b arises. Pixels to which none of the rules are applied remain unmodified. Black corner pixels 12 at the structures established by the rules (given white-to-black transitions) are then set to "white" from right to left, as a result whereof the image shown in FIG. 6c arises.

The same result (FIG. 6c) can be achieved when, given the image excerpt shown in FIG. 6a, corner pixels at black-to-white transitions are removed from left to right. This latter method is single-stage because adding and removing are implemented in one work step.

The following rules are used for smoothing digital image data:
  recognizing and smoothing 45° lines (2—2 lines, two units in x-direction, two in y-direction)
  retaining right-angled corners, not smoothing
  recognizing and smoothing 2–4 lines
  potential recognition and smoothing of 2–x lines dependent on the size of the recognition matrix (x is an even number>2).

When all rules are taken into consideration for the four initial directions and for the mirroring (2–4 lines are then equivalent to 4–2 lines), then a total of eight sub-rules derive.

Edge Problems when Smoothing

Figure 7:
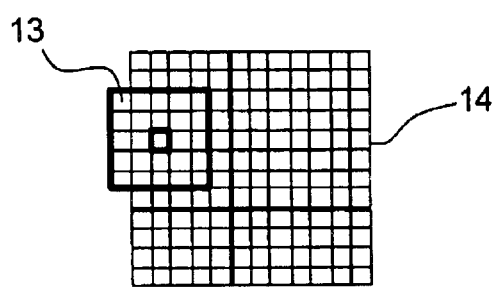
FIG. 7 a smoothing window in an image raster.

Not all pixels at the edges of the image to be smoothed (top, bottom, left, right) are available for the recognition matrix. Pixels that do not exist (for example, the pixel 13 to the left next to the image excerpt 14 shown in FIG. 7) are considered not set, i.e. as white.

Combining Scaling and Smoothing to One Procedure that Works in the Source Raster The two methods for scaling and for edge smoothing should now be combined. To that end, the smoothing equation 6 is inserted into one of the scaling equations 2 or 3.

Proceeding from a scaling with whole-numbered scaling factors according to equation 2, one obtains the following:

(Equation 7)
$$sm_{(i,j)} = fsmooth\left( q_{\left(\frac{i-\frac{G}{2}}{sx}, \frac{j-\frac{G}{2}}{sy}\right)}, \ldots, \right.$$
$$q_{\left(\frac{i+\frac{G}{2}}{sx}, \frac{j-\frac{G}{2}}{sy}\right)}, \ldots,$$
$$\left. q_{\left(\frac{i}{sx}, \frac{j}{sy}\right)}, q_{\left(\frac{i-\frac{G}{2}}{sx}, \frac{j+\frac{G}{2}}{sy}\right)}, \ldots, q_{\left(\frac{i+\frac{G}{2}}{sx}, \frac{j+\frac{G}{2}}{sy}\right)} \right).$$

What is considered a specific example with sx=sy=2 and G=5:

$$sm_{(i,j)} = fsmooth\left( q_{\left(\frac{i-2}{2}, \frac{j-2}{2}\right)}, \ldots, q_{\left(\frac{i+2}{2}, \frac{j-2}{2}\right)}, \ldots, \right.$$
$$q_{\left(\frac{i}{2}, \frac{j}{2}\right)}, \ldots, q_{\left(\frac{i-2}{2}, \frac{j+2}{2}\right)}, \ldots, q_{\left(\frac{i+2}{2}, \frac{j+2}{2}\right)} \right)$$
$$= fsmooth\left( q_{\left(\frac{i}{2}-1, \frac{j}{2}-1\right)}, \ldots, q_{\left(\frac{i}{2}+1, \frac{j}{2}-1\right)}, \ldots, \right.$$
$$\left. q_{\left(\frac{i}{2}, \frac{j}{2}\right)}, \ldots, q_{\left(\frac{i}{2}-1, \frac{j}{2}+1\right)}, \ldots, q_{\left(\frac{i}{2}+1, \frac{j}{2}+1\right)} \right)$$

It then follows for even i and even h that:

$$sm_{(i_g,j_g)} = fsmooth\left( q_{\left(\frac{i}{2}-1,\frac{j}{2}-1\right)}, q_{\left(\frac{i}{2}-1,\frac{j}{2}-1\right)}, q_{\left(\frac{i}{2},\frac{j}{2}-1\right)}, q_{\left(\frac{i}{2},\frac{j}{2}-1\right)} q_{\left(\frac{i}{2}+1,\frac{j}{2}-1\right)}, \right.$$
$$q_{\left(\frac{i}{2}-1,\frac{j}{2}-1\right)}, q_{\left(\frac{i}{2}-1,\frac{j}{2}-1\right)}, q_{\left(\frac{i}{2},\frac{j}{2}-1\right)}, q_{\left(\frac{i}{2},\frac{j}{2}-1\right)} q_{\left(\frac{i}{2}+1,\frac{j}{2}-1\right)},$$
$$q_{\left(\frac{i}{2}-1,\frac{j}{2}\right)}, q_{\left(\frac{i}{2}-1,\frac{j}{2}\right)}, q_{\left(\frac{i}{2},\frac{j}{2}\right)}, q_{\left(\frac{i}{2},\frac{j}{2}\right)}, q_{\left(\frac{i}{2}+1,\frac{j}{2}\right)},$$
$$q_{\left(\frac{i}{2}-1,\frac{j}{2}\right)}, q_{\left(\frac{i}{2}-1,\frac{j}{2}\right)}, q_{\left(\frac{i}{2},\frac{j}{2}\right)}, q_{\left(\frac{i}{2},\frac{j}{2}\right)}, q_{\left(\frac{i}{2}+1,\frac{j}{2}\right)},$$
$$\left. q_{\left(\frac{i}{2}-1,\frac{j}{2}+1\right)}, q_{\left(\frac{i}{2}-1,\frac{j}{2}+1\right)}, q_{\left(\frac{i}{2},\frac{j}{2}+1\right)}, q_{\left(\frac{i}{2},\frac{j}{2}+1\right)} q_{\left(\frac{i}{2}+1,\frac{j}{2}+1\right)} \right)$$

for odd i and even j:

$$sm_{(i_u,j_g)} = fsmooth\left( q_{\left(\frac{i}{2}-1,\frac{j}{2}-1\right)}, q_{\left(\frac{i}{2},\frac{j}{2}-1\right)}, q_{\left(\frac{i}{2},\frac{j}{2}-1\right)}, q_{\left(\frac{i}{2}+1,\frac{j}{2}-1\right)}, q_{\left(\frac{i}{2}+1,\frac{j}{2}-1\right)}, \right.$$
$$q_{\left(\frac{i}{2}-1,\frac{j}{2}-1\right)}, q_{\left(\frac{i}{2},\frac{j}{2}-1\right)}, q_{\left(\frac{i}{2},\frac{j}{2}-1\right)}, q_{\left(\frac{i}{2}+1,\frac{j}{2}-1\right)}, q_{\left(\frac{i}{2}+1,\frac{j}{2}-1\right)},$$
$$q_{\left(\frac{i}{2}-1,\frac{j}{2}\right)}, q_{\left(\frac{i}{2},\frac{j}{2}\right)}, q_{\left(\frac{i}{2},\frac{j}{2}\right)}, q_{\left(\frac{i}{2}+1,\frac{j}{2}\right)}, q_{\left(\frac{i}{2}+1,\frac{j}{2}\right)},$$
$$q_{\left(\frac{i}{2}-1,\frac{j}{2}\right)}, q_{\left(\frac{i}{2},\frac{j}{2}\right)}, q_{\left(\frac{i}{2},\frac{j}{2}\right)}, q_{\left(\frac{i}{2}+1,\frac{j}{2}\right)}, q_{\left(\frac{i}{2}+1,\frac{j}{2}\right)},$$
$$\left. q_{\left(\frac{i}{2}-1,\frac{j}{2}+1\right)}, q_{\left(\frac{i}{2},\frac{j}{2}+1\right)}, q_{\left(\frac{i}{2},\frac{j}{2}+1\right)}, q_{\left(\frac{i}{2}+1,\frac{j}{2}+1\right)}, q_{\left(\frac{i}{2}+1,\frac{j}{2}+1\right)} \right)$$

$$sm_{(i_g,j_u)} = fsmooth\left( q_{\left(\frac{i}{2}-1,\frac{j}{2}-1\right)}, q_{\left(\frac{i}{2}-1,\frac{j}{2}-1\right)}, q_{\left(\frac{i}{2},\frac{j}{2}-1\right)}, q_{\left(\frac{i}{2},\frac{j}{2}-1\right)}, q_{\left(\frac{i}{2}+1,\frac{j}{2}-1\right)}, \right.$$
$$q_{\left(\frac{i}{2}-1,\frac{j}{2}\right)}, q_{\left(\frac{i}{2}-1,\frac{j}{2}\right)}, q_{\left(\frac{i}{2},\frac{j}{2}\right)}, q_{\left(\frac{i}{2},\frac{j}{2}\right)}, q_{\left(\frac{i}{2}+1,\frac{j}{2}\right)},$$
$$q_{\left(\frac{i}{2}-1,\frac{j}{2}\right)}, q_{\left(\frac{i}{2}-1,\frac{j}{2}\right)}, q_{\left(\frac{i}{2},\frac{j}{2}\right)}, q_{\left(\frac{i}{2},\frac{j}{2}\right)}, q_{\left(\frac{i}{2}+1,\frac{j}{2}\right)},$$
$$q_{\left(\frac{i}{2}-1,\frac{j}{2}+1\right)}, q_{\left(\frac{i}{2}-1,\frac{j}{2}+1\right)}, q_{\left(\frac{i}{2},\frac{j}{2}+1\right)}, q_{\left(\frac{i}{2},\frac{j}{2}+1\right)}, q_{\left(\frac{i}{2}+1,\frac{j}{2}+1\right)},$$
$$\left. q_{\left(\frac{i}{2}-1,\frac{j}{2}+1\right)}, q_{\left(\frac{i}{2}-1,\frac{j}{2}+1\right)}, q_{\left(\frac{i}{2},\frac{j}{2}+1\right)}, q_{\left(\frac{i}{2},\frac{j}{2}+1\right)}, q_{\left(\frac{i}{2}+1,\frac{j}{2}+1\right)} \right)$$

For even i and odd j:

$$sm_{(i_u,j_u)} = fsmooth\left( q_{\left(\frac{i}{2}-1,\frac{j}{2}-1\right)}, q_{\left(\frac{i}{2},\frac{j}{2}-1\right)}, q_{\left(\frac{i}{2},\frac{j}{2}-1\right)}, q_{\left(\frac{i}{2}+1,\frac{j}{2}-1\right)}, q_{\left(\frac{i}{2}+1,\frac{j}{2}-1\right)}, \right.$$
$$q_{\left(\frac{i}{2}-1,\frac{j}{2}\right)}, q_{\left(\frac{i}{2},\frac{j}{2}\right)}, q_{\left(\frac{i}{2},\frac{j}{2}\right)}, q_{\left(\frac{i}{2}+1,\frac{j}{2}\right)}, q_{\left(\frac{i}{2}+1,\frac{j}{2}\right)},$$
$$q_{\left(\frac{i}{2}-1,\frac{j}{2}\right)}, q_{\left(\frac{i}{2},\frac{j}{2}\right)}, q_{\left(\frac{i}{2},\frac{j}{2}\right)}, q_{\left(\frac{i}{2}+1,\frac{j}{2}\right)}, q_{\left(\frac{i}{2}+1,\frac{j}{2}\right)},$$

-continued $q_{(\frac{i}{2}-1,\frac{j}{2}+1)}, q_{(\frac{i}{2},\frac{j}{2}+1)}, q_{(\frac{i}{2},\frac{j}{2}+1)}, q_{(\frac{i}{2}+1,\frac{j}{2}+1)}, q_{(\frac{i}{2}+1,\frac{j}{2}+1)},$ $q_{(\frac{i}{2}-1,\frac{j}{2}+1)}, q_{(\frac{i}{2},\frac{j}{2}+1)}, q_{(\frac{i}{2},\frac{j}{2}+1)}, q_{(\frac{i}{2}+1,\frac{j}{2}+1)}, q_{(\frac{i}{2}+1,\frac{j}{2}+1)})$ For odd i and odd j:

When one considers the dependents existing in the equations, then one obtains the following:

$sm_{(i_g,j_g)} = fsmooth_{gg}(q_{(\frac{i}{2}-1,\frac{j}{2}-1)}, q_{(\frac{i}{2},\frac{j}{2}-1)}, q_{(\frac{i}{2}+1,\frac{j}{2}-1)}, q_{(\frac{i}{2}-1,\frac{j}{2})}, q_{(\frac{i}{2},\frac{j}{2})},$ $q_{(\frac{i}{2}+1,\frac{j}{2})}, q_{(\frac{i}{2}-1,\frac{j}{2}+1)}, q_{(\frac{i}{2},\frac{j}{2}+1)}, q_{(\frac{i}{2}+1,\frac{j}{2}+1)})$ $sm_{(i_u,j_g)} = fsmooth_{ug}(q_{(\frac{i}{2}-1,\frac{j}{2}-1)}, q_{(\frac{i}{2},\frac{j}{2}-1)}, q_{(\frac{i}{2}+1,\frac{j}{2}-1)}, q_{(\frac{i}{2}-1,\frac{j}{2})}, q_{(\frac{i}{2},\frac{j}{2})},$ $q_{(\frac{i}{2}+1,\frac{j}{2})}, q_{(\frac{i}{2}-1,\frac{j}{2}+1)}, q_{(\frac{i}{2},\frac{j}{2}+1)}, q_{(\frac{i}{2}+1,\frac{j}{2}+1)})$ $sm_{(i_g,j_u)} = fsmooth_{gu}(q_{(\frac{i}{2}-1,\frac{j}{2}-1)}, q_{(\frac{i}{2},\frac{j}{2}-1)}, q_{(\frac{i}{2}+1,\frac{j}{2}-1)}, q_{(\frac{i}{2}-1,\frac{j}{2})}, q_{(\frac{i}{2},\frac{j}{2})},$ $q_{(\frac{i}{2}+1,\frac{j}{2})}, q_{(\frac{i}{2}-1,\frac{j}{2}+1)}, q_{(\frac{i}{2},\frac{j}{2}+1)}, q_{(\frac{i}{2}+1,\frac{j}{2}+1)})$ $sm_{(i_u,j_u)} = fsmooth_{uu}(q_{(\frac{i}{2}-1,\frac{j}{2}-1)}, q_{(\frac{i}{2},\frac{j}{2}-1)}, q_{(\frac{i}{2}+1,\frac{j}{2}-1)}, q_{(\frac{i}{2}-1,\frac{j}{2})}, q_{(\frac{i}{2},\frac{j}{2})},$ $q_{(\frac{i}{2}+1,\frac{j}{2})}, q_{(\frac{i}{2}-1,\frac{j}{2}+1)}, q_{(\frac{i}{2},\frac{j}{2}+1)}, q_{(\frac{i}{2}+1,\frac{j}{2}+1)})$ One can then see that the equations for even and for odd (i,j) respectively contain the same elements.

Proceeding from a square having the edge length of two of target pixels to be calculated, whereby the left lower corner represents even i and even j, the following conclusions can be drawn:

- four target pixels can be determined from nine source elements or, respectively, nine source pixels.
- the four target pixels are in fact calculated from the same source pixels;
- the dependents, however, reside at different locations in the initial equations; a separate equation is obtained for each of the four pixels.

In order to obtain the required quality of a target matrix having the size 5, a matrix having the size 3 suffices in the source region, i.e. the equations in the source region contain only 9 dependents instead of 25 in the target region.

- four target pixels can be calculated parallel (according to separate equations) from one source pixel (with surrounding). As a result thereof, the calculating outlay is in fact increased but the speed is also increased; the four target pixels are thereby calculated parallel and independently of one another. A combination of specific, logical sub-operations is possible dependent on the equations.
- the intermediate image is no longer utilized for smoothing, this being sx*sy (in our case 2*2=4) times larger than the source image. Only one-fourth of the data set therefore need undergo the smoothing operation given smoothing scaling.
- the scaling is contained in the process; the data need be processed only once not twice as in the above-described, known methods.
- overall, the smoothing scaling in the source raster enables a faster implementation of the operations given the same quality as in the two-stage process.
- the relative gain as a result of the single-stage method for smoothing and scaling is all the greater the greater the scaling factor is.
- the described method enables the combination of all scaling and smoothing rules that can be described according to Equations 2, 3, 4 and 6.

This example can be generalized as follows:

One proceeds from the smallest rectangle in the source region that can be directly imaged into the target region (only one pixel given whole-numbered scaling factors).

The rectangle is drawn with the target pixels (target rectangle). The smoothing matrix having the edge length G in the target region is placed around each corner target pixel.

The size of the source rectangle to be considered can be determined from the expanse.

All target pixels in the target rectangle can be calculated from the source pixels in the source rectangle. Only the source matrix need be covered for the calculation. The pixels in the target rectangle can be determined parallel independently from one another.

The improvements that derive due to the smoothing of the image data in the raster of the source image shall be illustrated with reference to FIGS. 8 and 9.

The basis is formed by a source image that is to be scaled by the factor 2 and then smoothed. A region 15 of 3×3 pixels is considered in the source image. After the scaling with a factor 2, a region 16 of the intermediate image having the size of 6×6 pixels is obtained therefrom.

A smoothing with a filter window 17 having the size 5×5 is now to be implemented within the region 16. This 5×5 window can be accommodated four times in the region 16. Once as shown in FIG. 9a and additionally as shown in FIGS. 9b, 9c and 9d. Each of the operations shown in FIGS. 9a through 9d can be computationally represented by a recognition matrix, whereby respectively one pixel value is determined per matrix. For example, the value of the pixel 18 is calculated from the position of the filter window 17 shown in FIG. 9a.

Four smoothed target pixels 18, 19, 20 and 21 are obtained from the recognition matrices on which FIGS. 9a through 9d are based. This group of target pixels is referenced in common as 22 in FIG. 9e.

The 3×3 source matrix 15 describes 512 possible pixel combinations. An intermediate matrix from which four target pixels then derive with a 5×5 smoothing can be determined for each of these combinations with a general scaling method (scaling factor 2). The scaling and the smoothing can be implemented in one step, since an unambiguous relationship between source matrix (central pixel with 8 surrounding pixels) and the target pixels (target matrix) exists. Each source pixel is thereby directly converted into four target pixels taking its surroundings into consideration.

Given a larger source matrix (for example, 5×5 pixels), a smoothing with a larger recognition matrix (for example, with a 9×9 matrix) is possible given a scaling factor of 2 in order to again obtain four target pixels. The following equation describes this behavior for whole-numbered scaling factors s that are the same in x and y directions:

$$e = s*(q_M - 1) + 1 \quad \text{(Equation 8)},$$

whereby:

$q_M$: size of the source matrix, e: size of the recognition matrix in the target raster, and s: scaling factor.

Example of Scaling Factors that are not a Whole Number

An example of a scaling and smoothing procedure wherein equation 6 applies with sx=sy=2.5 and G=5, is described on the basis of FIGS. 10 through 13. A source pixel square 23 having the edge length 2 corresponding to the raster width RW1=1/240 inches (source raster, 240 dpi) prescribed by the raster lines 23' and 23" is thereby imaged onto a target pixel square 24 having the edge length 5 corresponding to the raster width RW2=1/600 inches (target raster, 600 dpi) predetermined by the raster lines 24' and 24" in the scaling.

A smoothing matrix (FIG. 11) is placed around each of the 5×5 target pixels that lies within the 2×2 source pixel square 23. Taking the neighbors of the first order into consideration, the values for the 5×5 target pixels derive according to the above description from the group 25 of 4×4 source pixels, given G=5.

Specific Exemplary Embodiment for Scaling Factors that are not a Whole Number

In the above-described method, 5×5=25 target pixels are generated from 4×4=16 source pixels. When this method is realized in software with a look-up table, then this table covers 65536 entries of 25 bits each. Due to the byte-by-byte operation of microprocessors, 65536×4 bytes=262144 bytes are then occupied by the table. Such a large table can usually no longer be accommodated in the cache memory of standard microprocessors. The processing of the data can therefore ensue only relatively slowly. In order to increase the processing speed, respectively smaller groups of source pixels are processed in common in an improved procedure, whereby respectively 3×3 target pixels are dependent on only respectively 3×3 source pixels. The above-described work step is thereby divided into four sub-steps. A table is employed for each step, 9 target pixels being produced from 9 source pixels therewith. To that end, 4×512 entries of 9 bits each or, respectively, a table size of 4096 bytes is required. Compared to the aforementioned 262144 bytes, this is a memory reduction by the factor 64. The 3×3 target pixels generated in this way are then placed on top of one another in the form of an OR-operation.

Figure 12:
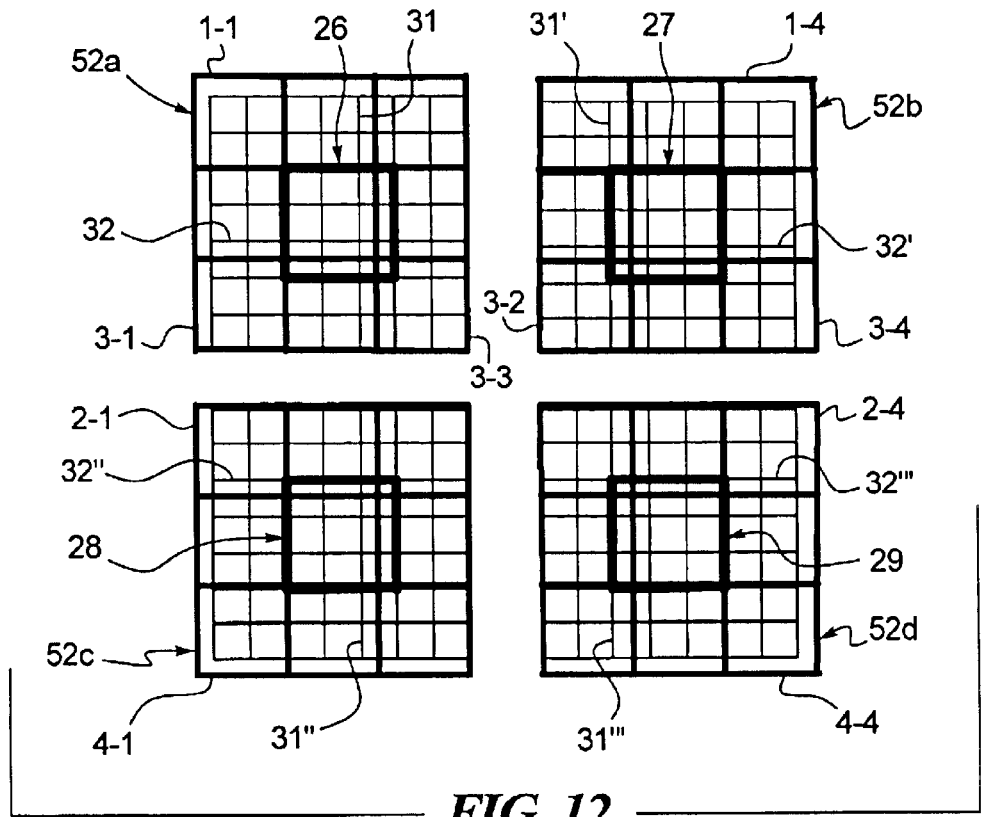
FIG. 12 various windows on which a smoothing is based.
Figure 13:
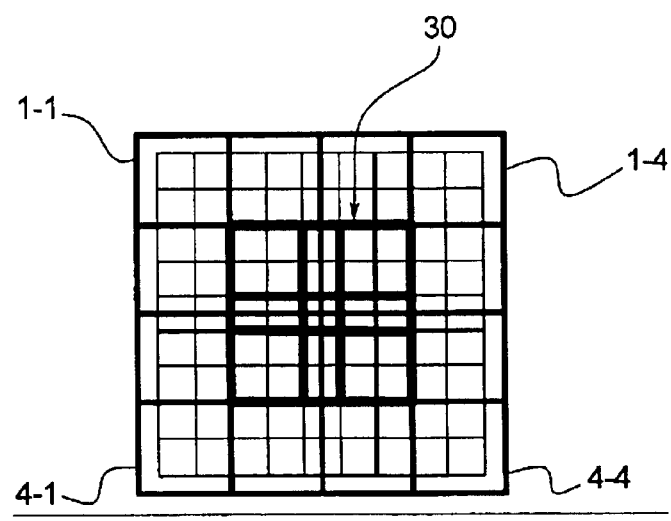
FIG. 13 the schematic diagram of a smoothing result.
Figure 14:
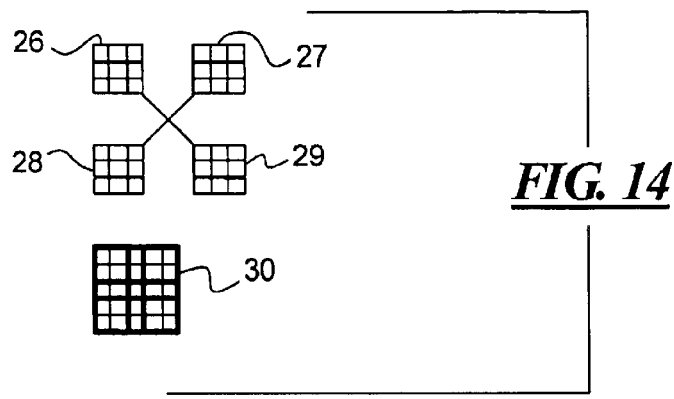
FIG. 14 an illustration of the superimposition of data.

FIGS. 12 and 13 illustrate this procedure: in FIG. 12, four source pixels 2—2, 2-3, 3-2 or, respectively, 3—3 are shown with their respective surrounding source pixels, i.e. source pixel windows 52a, 52b, 52c, 52d. The source pixels are present in a 240 dpi raster. A respective 3×3 target pixel square (matrix) 26, 27, 28 or, respectively, 29 are to be respectively formed from the source pixel 2—2, 2-3, 3-2 and 3—3, for example the target pixel square 26 for source pixel 2—2, the target pixel square 27 for source pixel 2-3, etc. The target pixel squares 26, 27, 28, 29 are then placed on top of one another such that the lines 31, 31', 31" and 31'" respectively align with one another, as do the lines 32, 32', 32" and 32'". Due to this overlay, the same source pixels (1-2, 1-3; 2-1 . . . 2-4; 3-1 . . . 3-4; 4-2, 4-3) of the source pixel windows 52a. . . 52d lie congruently on top of one another. Further, the 5×5 target pixel square 30 of FIG. 13 corresponding to the higher 600 dpi resolution derives as a result thereof. With reference to the source pixels 2—2, 2-3, 3-2 and 3—3 to be converted, the conversion thereby ensues by individual pixels and image line by image line according to the following rules:

In the first image line and all following lines having an odd-numbered line number, the first and all following odd-numbered source pixels are converted according to the source pixel window 52a (forming a respective target pixel matrix of the type 26); the second and all following even-numbered source pixels of these lines are converted according to source pixel window 52b (forming a respective target pixel matrix of the type 27). In the second image line and all following lines having an even-numbered line number, the first and all odd-numbered successor source pixels are respectively converted according to the source pixel window 52c into a target pixel matrix of the type 28, and the even-numbered source pixels are converted according to the source pixel window 52d into a target pixel matrix of the type 29.

The division into four steps that has just been described is possible when the respectively 3×3 target pixel squares (matrices 26, 27, 28, 29 in FIG. 12) are dependent only on the respective 3×3 source pixel windows 52a, 52b, 52c, 52d. This is prescribed by the scaling method employed and is also established in many scaling methods. The pixels placed on top of one another with an OR-operation are the same.

Figure 22:
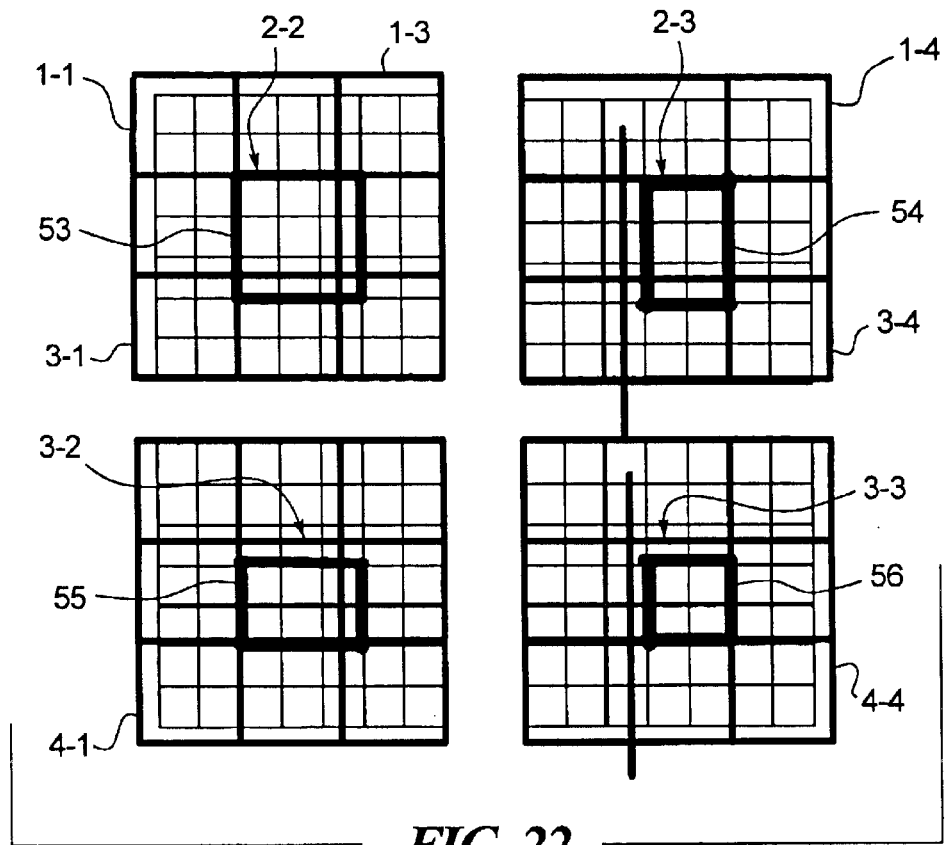
FIG. 22 a version for compiling target image matrices without superimposition of source pixels.
Figure 23:
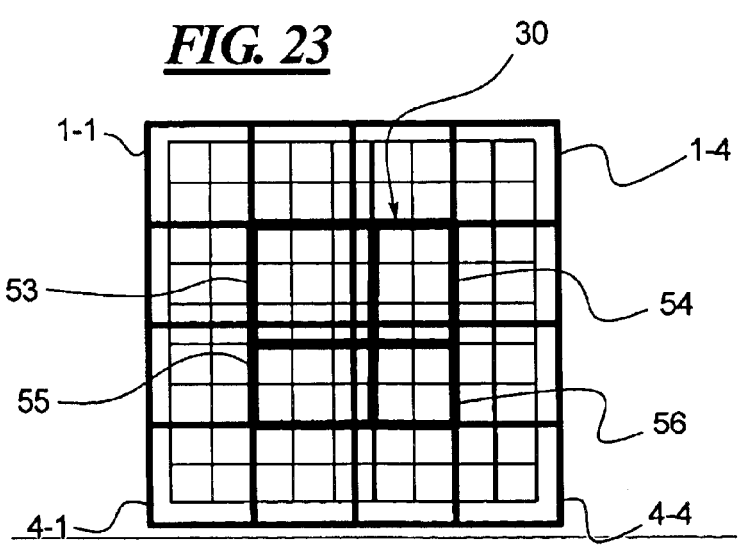
FIG. 23 the result of the compilation of FIG. 22

As an alternative to the described, symmetrical definition and joining by insertion into one another (overlapping) of the source pixels, an asymmetrical definition and joining is also possible according to FIGS. 22 and 23. For example, a 3×3 target pixel square 53 is thereby formed from the source pixel 2—2, a 2×3 target pixel square 54 is formed from the source pixel 2-3, a 3×2 target pixel square 55 is formed from the source pixel 3-2, and a 2×2 target pixel square 56 is formed from the source pixel 3—3. The target pixel rectangles or, respectively, squares 53, 54, 55 and 56 (target image matrices) formed as a result thereof are then joined as target image without overlap. The other method steps cited in the symmetrical processing (for example, register entry, index formation, line-by-line procedure) are thereby identically implemented.

The above-described versions for forming the target pixel squares can be advantageous for specific implementations. Of course, the same principles can also be applied to other values of sx, sy and G.

Byte-by-Byte Processing of the Source Pixels for Conversion of the Two-Dimensional Problem into a One-Dimensional Problem The method that has been presented converts rectangles of source pixels into rectangles of target pixels. Given a digital data processing realized in hardware, software or firmware, a byte-oriented procedure can generally be imaged better onto the functioning of the electronic components than a bite-oriented procedure. Source pixels are generally present as source image in a memory area that is organized in rows byte-oriented. A stored row thereby corresponds to an image line (scan line).

Figure 15A:
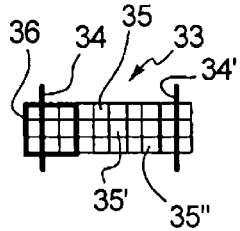
FIG. 15 the processing of image data with a smoothing window.
Figure 15B:
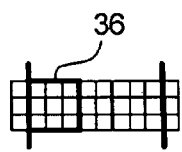
Figure 15C:
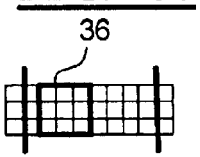
Figure 15D:
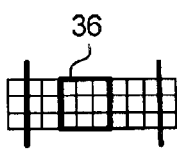
Figure 16:
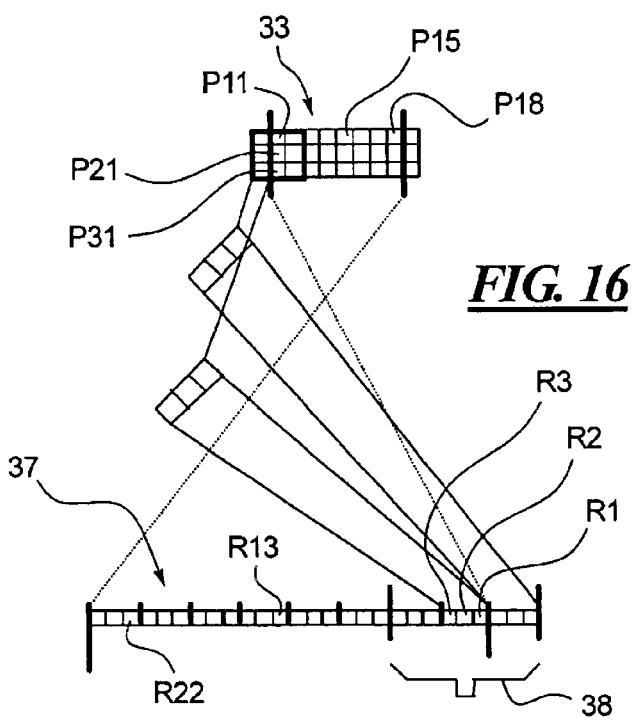
FIG. 16 the deposit of two-dimensional image data in a one-dimensional register.
Figure 17:
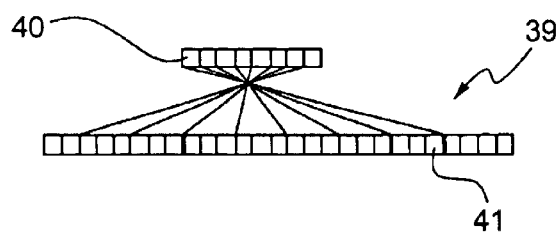
FIG. 17 the conversion of a plurality of pixels of a source line into register pixels.
Figure 18:
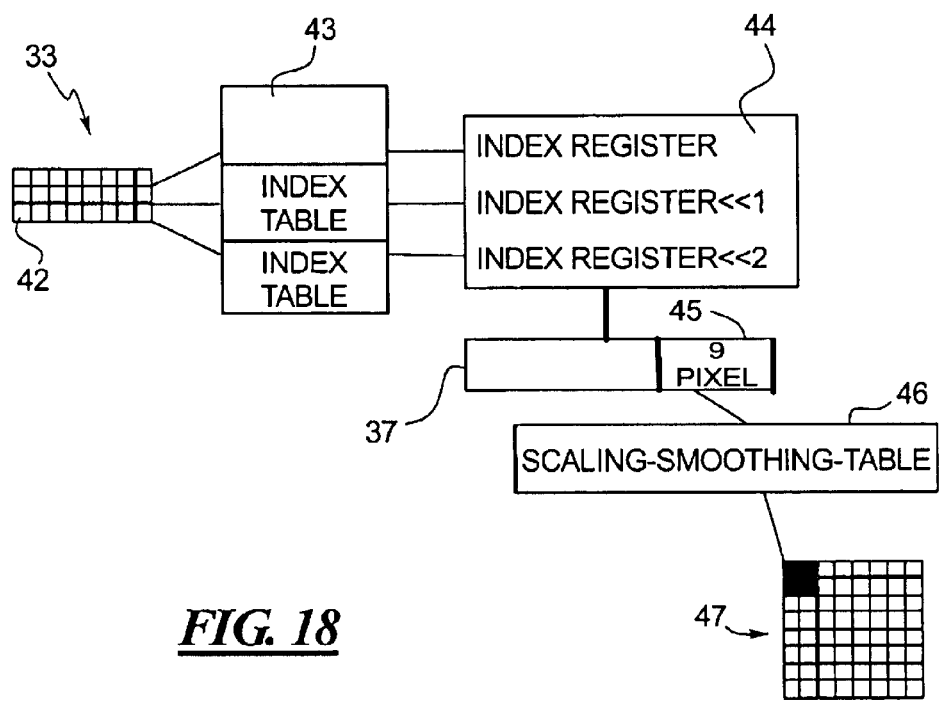
FIG. 18 a data processing process, whereby scaled and smoothed target image data are acquired directly from the source image data.

A byte-oriented procedure with which the source pixels are one-dimensionally processed with the assistance of a shift register is illustrated on the basis of FIGS. 15 through 18. To that end, the source pixels are entered into the shift register according to specific conventions, as shown in FIG. 16. This can happen directly in hardware in that the individual lines are transferred to the corresponding locations in the register. Given a realization in software, a look-up table is employed for performance reasons. This table is constructed according to FIG. 17. Upon entry into the register, the upper scan line is directly copied into the register after conversion, the next scan line is shifted one pixel position toward the left after conversion and is then entered into the register, the third scan line is entered into the register shifted by two positions toward the left after conversion (FIG. 18).

This procedure sequences in detail as follows: FIG. 15a shows an excerpt 33, the three stripes 35, 35' and 35" of the source image that are respectively 8 pixels wide and lie above one another and are limited by the lines 34 and 34'. The respectively last pixel of the proceeding 8 pixels are shown at the left next to this and the respectively first pixel of the next 8 pixels are also shown to the right thereof A 3×3 recognition window 36 is shifted across this structure from left to right. The sequence of the FIGS. 15a, 15b, 15c and 15d illustrates this for the first four shift events.

The shift effect is achieved by specific entry into the register 37 and by shifting three positions toward the right, as illustrated in FIG. 16 with the processing step 45. The eight values (1 byte) lying side-by-side in an image line are thereby respectively entered such into the register 37 from right to left that neighboring line values in the register are respectively distanced three spaces from one another.

When in the illustration "Pxy", x and y respectively indicate the index in x or, respectively, y direction and "Rn" indicates the no position in the register 37, then, for example, the values of the pixels P11, P15 and P18 (image line 36) are stored at the positions R1, R13 and R22 in the register 37. The respectively first values P21 and P31 of the following image lines 34 and 35, in contrast, lie directly next to the value of P11 at the positions R2 and R3 in the register. What is thereby achieved is that the two-dimensional pixel values of the image can be entered byte-by-byte and line-by-line into the one-dimensional register, and that the values are available for read out column-by-column in the register. An imaging of the two-dimensional values of the image thus ensues into the one-dimensional register 37.

The 3×3=9 pixels of the window 36' yield the index for the combined scaling/smoothing table. This index can be directly taken from the register 37 as the value formed from the region 38 (the nine right-hand, neighboring bits of the register 37). The bits of this value correspond to the recognition window and yield the smoothed target pixels.

The corresponding indices for the remaining seven bits of an image line (35, 35' or 35") are subsequently obtained by respective shifting of the register values three places toward the right. This shift event then corresponds to the shifting of the recognition 36 in the sequence of FIGS. 15a through 15d.

The index data can be constructed once for each block of 3 bytes source data in a register. The determination of the indices for the scaling/smoothing matrices of an image line can then be optimized even more. The structure of the index register from the respective byte, namely, can then be realized in only one step via a table that has the properties schematically shown in FIG. 17.

The lines 39 respectively connect the left edge of a source 40 to the register position 41 appertaining thereto. For the two lower bytes of the source, the conversion table is then simply shifted one pixel (the middle pixel) or two pixels (the lower byte) toward the left and is ordered onto the index register. This conversion table is referred to below as index table.

FIG. 18 again illustrates the entire procedure for smoothing and scaling the source image data based on a byte-by-byte processing and programmed in software. The 30-bit register 37 is filled (whereby, of course, a 32 bit register can also be employed) via the look-up table from respectively three bytes input image data 42 in the excerpt 33 of the source image. When storing the second or, respectively, third byte into the register 37, a respective shift by one position is undertaken in the processing step 44 (<<1, <<2). Register locations that have already been written with the preceding byte are overwritten with the following data with an OR-operation. The lower 9 bytes 45 of the register 37 yield an index for the scaling/smoothing table 46 from which the scaled and smoothed target pixels 47 can be directly taken. These are then deposited in the target region. Subsequently, the next 3-byte block in the source region is processed. This procedure is repeated moving across the entire source image. Pixels that have not been set are assumed at the edges for the edge pixels that are not present.

Generalization of the Byte-by-Byte Offering of the Source Pixels

The above example was based on a quadratic smoothing window with Qx=Qy=3 and on binary pixel data. Expressed generally, however, a square of target pixels is to be determined from a rectangle of source pixels in the procedure of smoothing and scaling.

Figure 19:
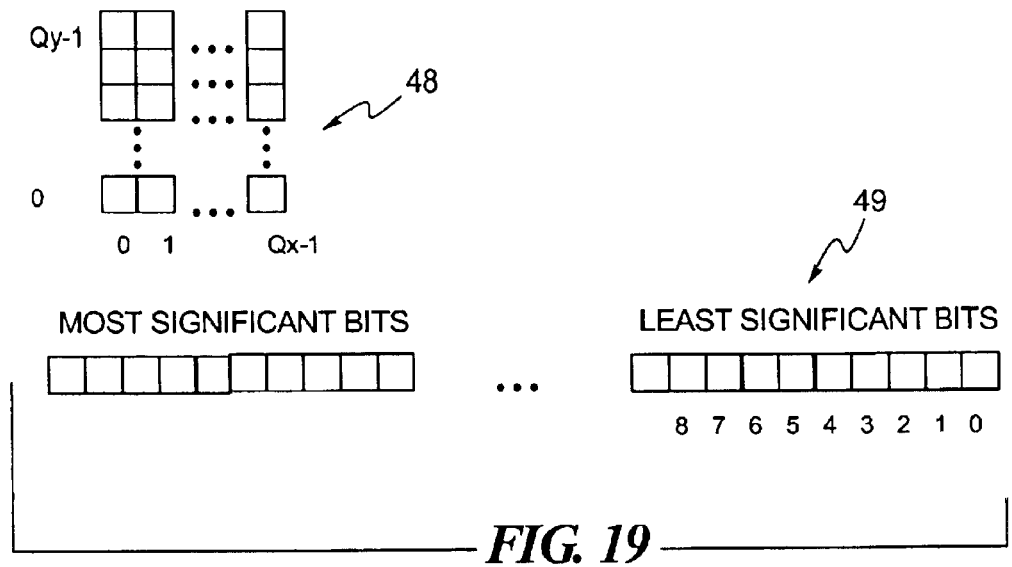
FIG. 19 a conversion of digital image data into index bits.

Proceeding from a source pixel rectangle 48 having the width $Q_x$ in x-direction and the width $Q_y$ in y-direction shown in FIG. 19, a shift register having the size $$B = Q_y \times W \times ((8n/W) - 1 + Q_x)$$

is required. 8n/W must thereby be a whole number. The shift register is filled according to the following equation in each step with respectively n bytes of each scan line (line) in the source pixel rectangle:

$$R_{(i+A)} = q(i/Q_y, Q_{y,-1} - (i\%Q_y)) \qquad \text{(Equation 9)},$$

whereby the following apply:
$R_i$: value of the $i^{th}$ register bit
q(k,l): value of the source pixel with the position (k,l)
/: integer division
%: modulo division
$A = W \times (Q_y \times Q_x - 1)$
n: plurality of bytes read in per line
W: value of a pixel, i.e. bits per pixel (binary, gray scale value, color value), and
B: width of the shift register in bits As an alternative to the rule according to Equation 9, the rule $$R_{(i+A)} = q(i/Q_y, i\%Q_y) \qquad \text{(Equation 9a)}$$

can also be employed.

When the shift register is pre-occupied according to Equation 9 or 9a, then the lower W*Qx*Qy bits 49 contain the desired source window in one-dimensional presentation (called index bits below).

By shifting Qy pixels (W*Qy bits) toward the right, the index bits 49 for the next source window are obtained. This procedure is implemented 8n/W times (8n/W must be whole number and respectively n bytes were read in per source line); the filling of the register with the next source bytes follows thereafter.

Figure 20:
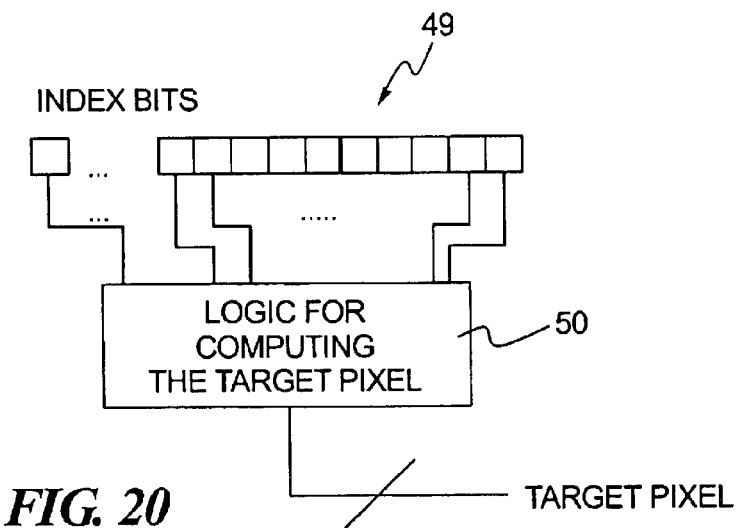
FIG. 20 a hardware arrangement for the conversion of digital image data.

FIG. 20 shows a corresponding realization in hardware. The respectively obtained index bits 49 form the input signals for a logic circuit 50 for calculating the target pixels.

Figure 21:
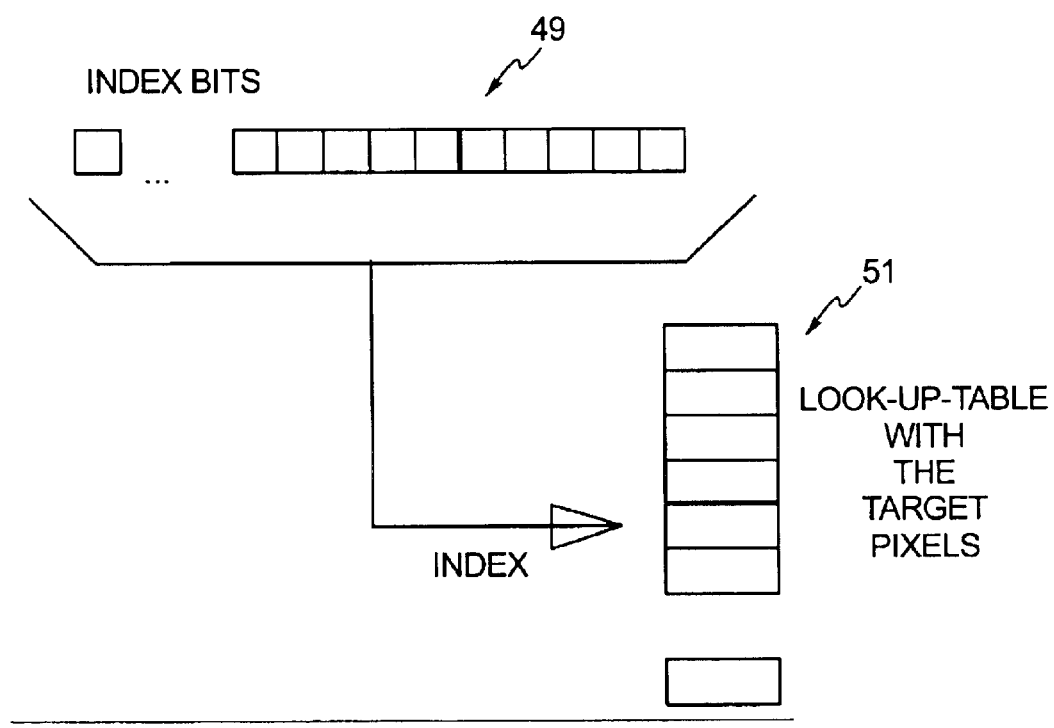
FIG. 21 a software concept for the conversion of digital image data.

FIG. 21 schematically shows a conversion in the form of software. The index bits 49 here serve as index for addressing a look-up table 51 that contains the previously calculated pixels for this combination.

Processing Gray Scale/Color Data

The processing of grayscale of color pixels ensues according to the same principle as with binary data. All boxes in the illustrated figures then represent one pixel that contains W bits per pixel instead of one bit per pixel given binary data. The index formation as well as the equations for the combination of scaling and smoothing all refer to pixels; the only thing changed is the plurality of bits per pixel. The scaling/smoothing table then contains grayscale or, respectively, color values instead of bits per pixel. In FIG. 18, the shift values onto the index register (<<1, <<2) indicate pixel positions; expressed in bits, this is (<<×W, <<2×W) bits. In the same way as for binary data, the method can thus also be used for the processing of data having W bits per pixel in order to convert data of a first raster into a second that is finer (scaling up).

Increasing the Gray/Color Steps

Up to now, applications have been described that convert data of a first resolution into data of a second resolution, whereby the second resolution is finer than the first and the plurality of gray/color steps remains the same. The disclosed method, however, can also be used for an increase in the gray/color steps (only referred to below as gray scales). The basis is formed by a scaling factor S, the source data are present with Wq bits per pixel and the target data are to be produced with Wz bits per pixel.

Overall, $S^2$ target pixels with $2^{W_z}-1$ variation possibilities are required at the end. According to the previous method, $S^2$ target pixels would be obtained with $2^{W_q}-1$ variation possibilities. We achieve the expanded variation possibilities in that scaling is carried out with a new, higher scaling factor Sr. For the sake of simplicity, this is usually a whole number. The following inequation is to be solved for this purpose:

$$Sr^2 * (2^{W_q} - 1) \geq S^2 * (2^{W_z} - 1)$$

$$Sr^2 \geq S^2 * \frac{2^{W_z} - 1}{2^{W_q} - 1}$$

$$Sr \geq S * \sqrt{\frac{2^{W_z} - 1}{2^{W_q} - 1}}$$

The additional pixels in the target region that derive due to the higher scaling factor are then converted into the required gray scales.

Wq bits per pixel of the source data
Wz bits per pixel of the target data
S scaling factor
Sr resulting aggregate scaling factor This is to be presented by way of example on the basis of a conversion of binary 300 dpi data into 300 dpi data having 2 bits per pixel. Only the gray scales, not the resolution are enhanced here. The following applies:

$Wq = 1$ $Wq = 2$ $S = 1$ $$Sr \geq 1 * \sqrt{\frac{2^2 - 1}{2^1 - 1}} = \sqrt{\frac{4-1}{2-1}} = \sqrt{\frac{3}{1}} = \sqrt{3}$$

For example, Sr=2 is selected.

Scaling factor 2, we obtain 4 target pixels for a source pixel. The four acquired pixels have values between b0000 and b1111, whereby the preceding b indicates binary notation. These pixels are now converted into gray scales, whereby the plurality of black pixels (for example, having pixel value 1) is summed up and converted into a grayscale value. The conversion need not ensue linearly, it can also be based on the (non-) linearity of the output unit. The conversion ensues with a table, for example

| Pixel Value | Grayscale Value |
|---|---|
| No black pixel | |
| b0000 | b00 |
| one black pixel | |
| b0001 | b01 |
| b0010 | b01 |
| b0100 | b01 |
| b1000 | b01 |
| two black pixels | |
| b0011 | b10 |
| b0101 | b10 |
| b1001 | b10 |
| b0110 | b10 |
| b1010 | b10 |
| b1100 | b10 |
| three black pixels | |
| b0111 | b11 |
| b1011 | b11 |
| b1101 | b11 |
| b1110 | b11 |
| four black pixels | |
| b1111 | b11 |

Given a size of the smoothing window of G=5 in the target region, Qx=Qy=3 in the source region, the scaling/smoothing table 46 in FIG. 16 then has 512 entries with a respective pixel each that is composed of two bits. Since the conversion into gray scales is already worked into the scaling/smoothing table, this does not cause any performance loss.

Use of the Variability with Respect to the Scaling and Smoothing Algorithms Employed Various combinations of scaling and smoothing can be realized by simple replacement of the content of the scaling/smoothing table without having to influence the rest of the apparatus, regardless of whether implemented in hardware or software. This enables specific scaling and smoothing methods to be prescribed, for example in print data, whereby it is not fixed in advance as to what resolution the printout should occur with. Prescribing the method for a specific source image can ensue in that the optimum methods can be selected, for example, from a set of continuously numbered standard methods for the source data via two additional parameters. Alternatively, the equations of the methods can be handed over in encoded form. The form of the encoding is thereby freely selectable. When, for example, in a printing system, input data having various resolutions are to be processed (different scaling factors), a respectively separate device is required for this purpose.

Generalization of the "Smoothing"

Particularly when processing color data, there are algorithms for filterings that, just like the smoothing algorithms, shift a window (square) having an odd-numbered edge length G across the target pixels and redefine the central pixel from the surrounding pixels. When this procedure is connected with a scaling, then it can be implemented in the source region exactly like the method described here; the scaling/smoothing table would then, for example, represent a scaling/filtering table.

The invention was specifically described for employment in a printer that converts the image data from a first raster into a second raster upon retention or enhancement of the gray scales or, respectively, color values. Only an enhancement of gray scales/color steps in the same raster is also possible. It is thereby clear that the image data can also be edited such within a computer that they are available in a resolution adapted to the printer. Particularly in a network wherein print jobs from various computers are sent to a central printer, this will generally be the case. The conversion can thereby ensue both in the sending computer as well as in an intervening computer that administers the print jobs.

Although other modifications and changes may be suggested by those skilled in the art, it is the intention of the inventors to embody within the patent warranted hereon all changes and modifications as reasonably and properly come within the scope of their contribution to the art.

I claim:

1. A method for converting digital source data referring to source pixels in the raster of a first resolution into digital target data in the raster of a second resolution, comprising the steps of:
    (a) scaling the digital source data by at least one scaling factor selected from a plurality of scaling factors including non-whole number scaling factors;
    (b) allocating a target image matrix to each of the digital source datum on a basis of a surround window surrounding the source pixel and determining the digital target data from neighboring target image matrices such that each target pixel is directly formed from a source pixel taking the surroundings thereof into consideration,
    (c) using each digital source datum for smoothing the target data to be determined from all neighboring source data, and
    (d) implementing scaling and smoothing such in a common processing step that
        (d1) the target data are smoothed in the raster of the source data.

2. A method according to claim 1, further comprising the step of:
    superimposing neighboring target image matrices on one another for determining the target data or are joined without overlap.

3. A method according to claim 1, wherein the scaling factor has a fractional value.

4. A method according to claim 1, wherein the scaling and smoothing steps include generating a respective index allocated to the target image matrix from the source data individually pixel-by-pixel, the target data being determined with said index.

5. A method according to claim 4, further comprising the step of:
    using the index for addressing a look-up table that contains the target data.

6. A method according to claim 4, further comprising the step of:
    using the index as an index signal for driving an electronic circuit that forms the target data from the index signals.

7. A method according to claim 4, further comprising the steps of:
    storing the source data byte-by-byte in a shift register,
    shifting an interrelated group of data in the shift register with each processing clock, as a result whereof the index is formed from bits of the shift register lying next to one another after the shifting of all data of the group.

8. A method according to claim 1, wherein the shift register is filled according to the following rules with every processing clock:
    (a) R0 through R(A−1) remain unaffected and
    (b) R(i+A)=q(i/Qy,Qy−1−(i%Qy)) and
    R(i+A)=q(i/Qy, i%Qy),
    whereby the following applies:
    Ri: value of the ith register bit
    Qx: window width in x-direction
    Qy: window width in x-direction
    q(k,l): value of the source pixel having the position (k,l)
    /: integer division
    %: modulo division and
    A=Qy*(Qx−1).

9. A method according to claim 1, wherein pixel data belonging to images are processed as the digital source data.

10. A method according to claim 1, further comprising the steps of:
    processing excerpts of the image having l×m source pixels in common as a window;
    forming target image matrices each respectively having n×p target pixels from each source pixel window; and
    depositing the target pixels of neighboring target pixel matrices in a memory next to one another or overlapped.

11. A method according to claim 10, wherein neighboring target image matrices are overlapped with an OR-operation.

12. A method according to claim 11, wherein the source pixel windows each respectively comprise 3×3 pixels for scaling factors Sfx=Sfy=2.5; and further comprising the steps of:
    forming exactly one target image matrix having 3×3 target pixels from each source pixel window; and
    forming exactly 5×5 target pixels from respectively four target image matrices by an OR-operation.

13. A method according to claim 1, further comprising the step of:
    allocating a grayscale value to each source pixel.

14. A method according to claim 13, wherein at least one of a scaling and smoothing ensues in the grayscale value raster.

15. A method according to claim 13, wherein at least one of a scaling and smoothing ensues in the color value raster.

16. A method according to claim 1, further comprising the step of:
    allocating a color value to each source pixel.

17. A method for converting digital source data in a raster of a first resolution into digital target data in a raster of a second resolution, comprising the steps of:
    (a) scaling and smoothing the digital source data by a scaling factor selected from a plurality of scaling factors, said scaling factors including non-whole number scaling factors;
    (b1) selecting a scaling rule from a plurality of selectable scaling rules,
    (b2) selecting a smoothing rule from a plurality of smoothing rules,
    (c) forming a single scaling and smoothing rule from the selected scaling rule and the selected smoothing rule, both a smoothing of the digital target data in the raster of the digital source data as well as a scaling ensuing in respectively one processing step with said single scaling and smoothing rule during formation of the target data,
    (c1) allocating a target image matrix to each source datum on a basis of a surround window surrounding the digital source pixel and determining the digital target data from neighboring target image matrices such that each target pixel is directly formed from a source pixel taking the surroundings thereof into consideration,
    (d) using each source datum for smoothing the target data to be determined from all neighboring source data.

18. A method according to claim 17, wherein the selecting of the scaling rule ensues on a basis of a print job.

19. A method according to claim 18, further comprising the step of:
   using different smoothing rules region-by-region within the print job.

20. A method according to claim 17, wherein the selecting of the smoothing rule ensues on a basis of a print job.

21. A method for converting digital source data referring to source pixels in a raster of a first resolution into digital target data in a raster of a second resolution via scaling by at least one scaling factor according to a scaling rule and smoothing according to a smoothing rule, comprising the steps of:
   (a) using each source datum to smooth all neighboring source data;
   (b) allocating a target image matrix to each source datum on a basis of a surround window surrounding the source pixel; and
   (c) determining target data from neighboring target image matrices, such that target data are smoothed in a raster of the source data, and scaling and smoothing ensues in a single and common step, wherein said scaling includes scaling by a scaling factor selected from a plurality of scaling factors, said plurality of scaling factors including whole number and non-whole number scaling factors.

22. A method for converting digital source data in a raster of a first resolution into digital target data in a raster of a second resolution via scaling by at least one scaling factor according to a scaling rule and smoothing according to a smoothing rule, comprising the steps of:
   (a) prescribing a scaling rule for scaling the data by at least a scaling factor selected from a plurality of scaling factors including non-whole number scaling factors from a plurality of selectable scaling rules;
   (b) prescribing a smoothing rule for smoothing the source data from a plurality of selectable smoothing rules;
   (c) combining the scaling rule and the smoothing rule into a single scaling and smoothing rule, such that
      (c1) each source datum can be employed for smoothing all neighboring source data,
      (c2) a target image matrix is associated with each source datum individually pixel-by-pixel using a surrounding window surrounding the source pixel, and
      (c3) the target data are determined from neighboring target image matrices, such that the target data are smoothed in the raster of the source data and the scaling ensues in a single and mutual step.

* * * * *